No. 696,554. Patented Apr. 1, 1902.
A. T. DUDLEY.
SUPPORTING TOOL.
(Application filed Jan. 30, 1901.)
(No Model.) 4 Sheets—Sheet 2.
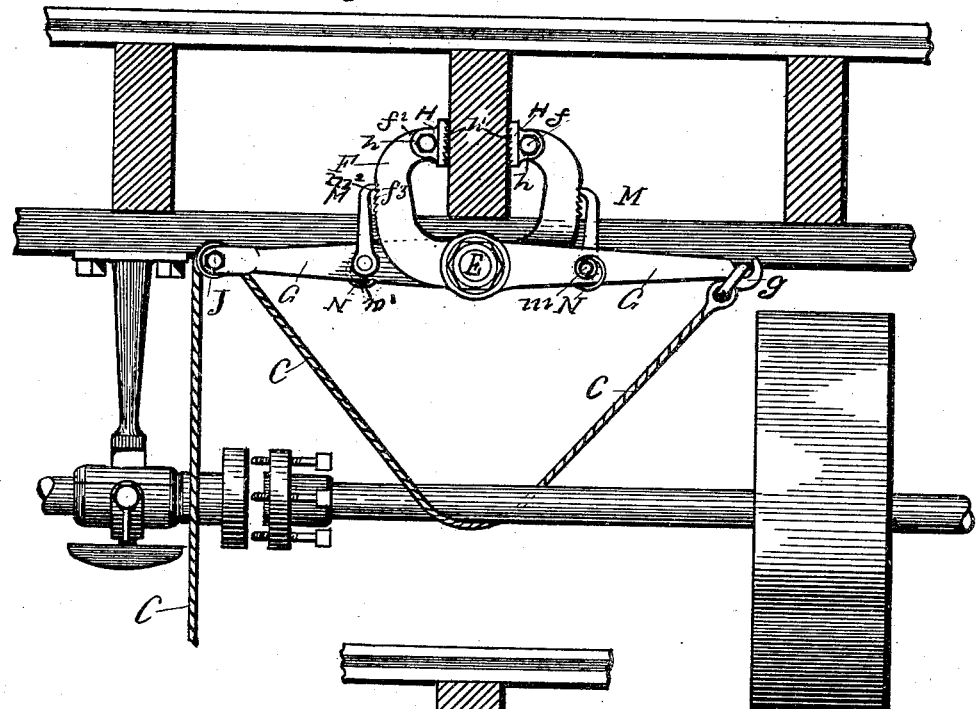
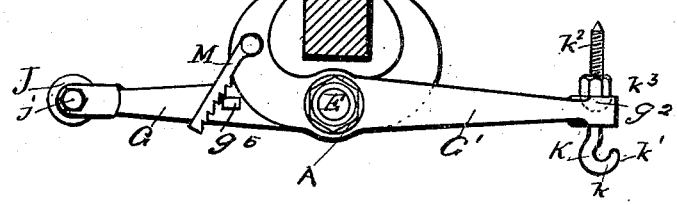
WITNESSES:
Jacob Addison
O. B. Schnall
INVENTOR
Alpha T. Dudley.

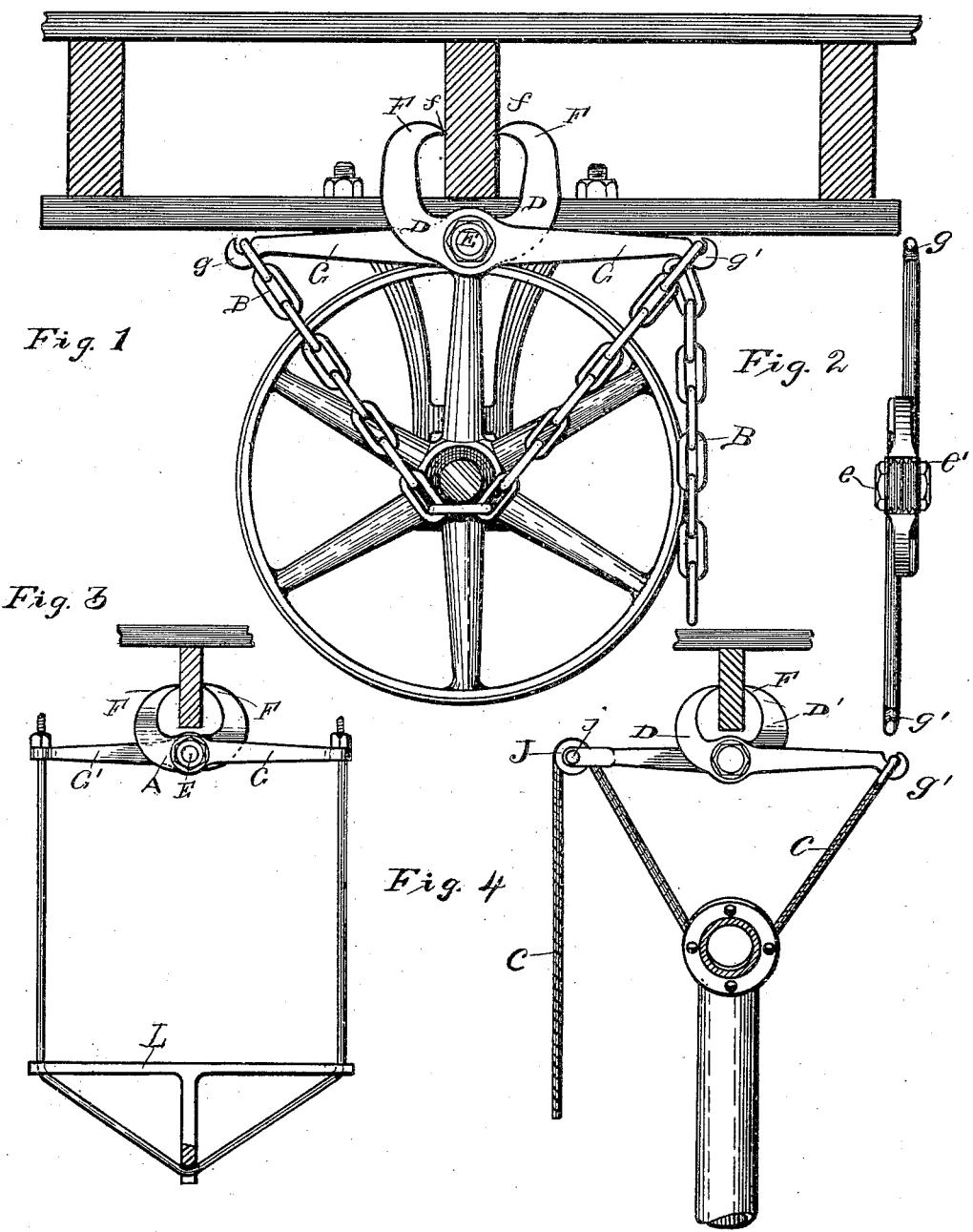

No. 696,554. Patented Apr. 1, 1902.
A. T. DUDLEY.
SUPPORTING TOOL.
(Application filed Jan. 30, 1901.)
(No Model.) 4 Sheets—Sheet 3.
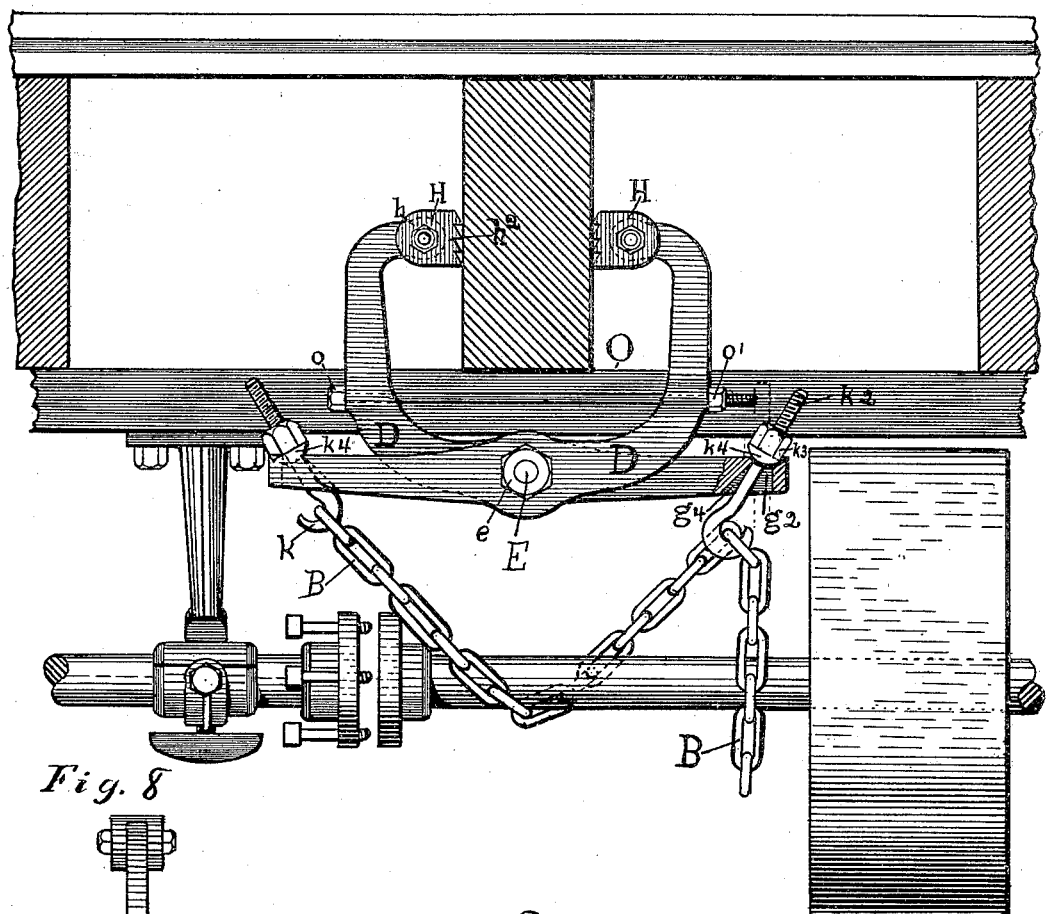
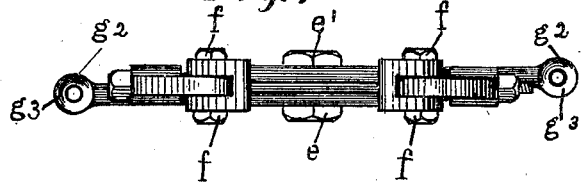
WITNESSES: INVENTOR
Jacob Addison Alpha T. Dudley
O. B. Schmall No. 696,554. Patented Apr. 1, 1902.
A. T. DUDLEY.
SUPPORTING TOOL.
(Application filed Jan. 30, 1901.)
(No Model.) 4 Sheets—Sheet 4.

WITNESSES
Jacob Addison
O. B. Schmall

INVENTOR
Alpha T. Dudley

UNITED STATES PATENT OFFICE.

ALPHA TRUEWORTHEY DUDLEY, OF BROCKTON, MASSACHUSETTS.

SUPPORTING-TOOL.

SPECIFICATION forming part of Letters Patent No. 696,554, dated April 1, 1902.

Application filed January 30, 1901. Serial No. 45,315. (No model.)

*To all whom it may concern:*

Be it known that I, ALPHA TRUEWORTHEY DUDLEY, a citizen of the United States, residing in Brockton, in the county of Plymouth and State of Massachusetts, have invented a new and Improved Supporting-Tool, of which the following is a specification.

My invention relates to shafting-supports, and has for its object the temporary support of line-shafts and other similar work while adjusting the same to the hangers or undergoing repairs and for other analogous work.

In the present state of the art of erecting line and other shafting the most primitive means are used, requiring a number of men who stand idle nine-tenths of the time in order to render the necessary aid at the proper time, while to prepare the necessary props and stanchions for the temporary support of the shaft while rebabbitting a journal-box or resetting a pulley nearly always requires for each time more labor, time, and expense than a full supply of these tools will cost. In addition to other disadvantages of present and prior methods grave accidents frequently result from unavoidable causes attendant thereon.

I overcome the above defects by the means set forth in the following specification and illustrated in the accompanying drawings, in which—

Figure 10:
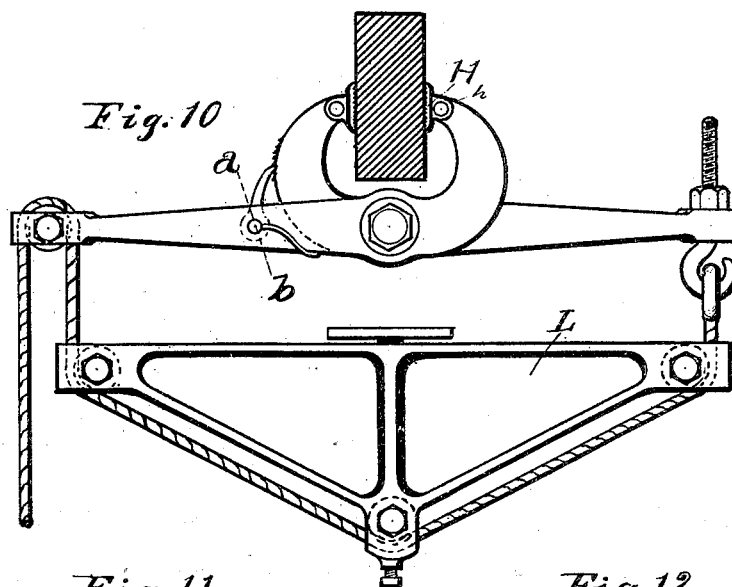
Figure 11:
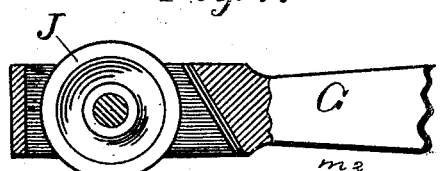
Figure 12:
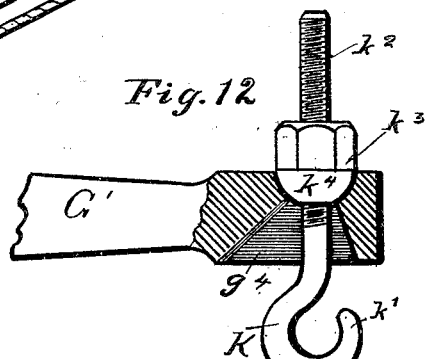
Figure 13:
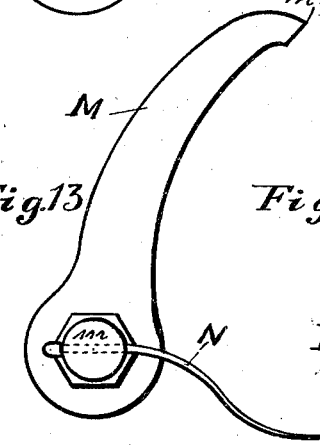
Figure 14:
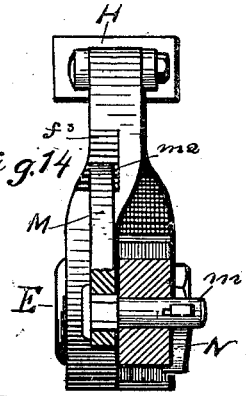
Figure 15:
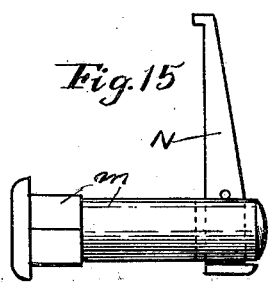

Figure 1 is an elevation of my improved supporting-tool in operation and illustrates the method of supporting a shaft, which in this view runs parallel with the floor-beam, with the pulley and hanger shown in the rear. This view represents the simplest form of my improved hanging-tool, consisting of a clamp with vertical jaws and horizontal arms provided with hooks at their outer extremities, upon which the supporting-chain is mounted or hung. This form requires the exertion of sufficient strength by the operator to lift the shaft from its seat in order to hook the chain to the arm. Fig. 2 is a plan view of the clamp shown in Fig. 1 and shows the teeth on the jaws for engaging the floor-beam. The head and nut of the pivot-bolt and the lateral curvature in the jaws which brings their faces in apposition are shown in this figure. Fig. 3 illustrates a simple chair with rope or rod supports, with delicate means for adjusting the height of the work. Fig. 4 is a view of another simple form of the clamp, the arms of which are provided with hook and pulley for lifting the work by means of a cable which passes under the work and over the pulley. Fig. 5 illustrates a similar form of tool additionally provided with a pair of pivoted clamping-jaws, which are self-adjusting, and a pair of locking dogs or pawls seated or pivoted on the arms and provided with teeth which engage ratchets on the external face of the jaws in order to hold the bite on the floor-beam and prevent the tool from falling before the work is lifted or after the weight is removed. Fig. 6 shows an approved form of clamp with a tension-hook on the right and a pulley on the left arm, with a cable extending from arm to arm. The tension-hook provides for the delicate adjustment of the shaft for babbitting a journal-box or adjusting the bolts in the shaft-coupling, either of which may be done expeditiously and with the greatest nicety. The tension-hook is provided with a ball-and-socket joint, the shape of which is indicated by the dotted line on the right. In this case the dog is inverted and pivoted to the jaw and is provided with ratchet-teeth upon the underside, which engage the locking-lug by gravity, holding securely the bite on the beam. This construction obviates the spring which is shown in Fig. 5 for holding the dog-teeth in engagement with the ratchet on the jaw of the clamp. It will be seen also that one dog performs the function of holding both jaws to the beam. Fig. 7 shows another method of securing the bite on the beam, which consists of a bolt passing through perforations in the jaws of the clamping-tool. This figure also illustrates more accurately the means for the delicate adjustment of the shaft to any position required or desired by tension-hooks at each end of the arms or clamp. On the right a part of the boss is broken out, disclosing the ball and cup of the joint and also the outline of the triangular slot which provides for a swing of the tension-hooks to accommodate the line of stress to the various elevation of shafting, as indicated by the length of the hangers or diameter of the pulleys mounted thereon. Figs. 8 and 9 are side and plan views of the same tool, illustrating the same form of parts from different points of view. Fig. 10 illustrates my improved supporting-tool in its preferred form with self-adjusting jaws, locking-pawl, a pulley for elevating, a threaded hook for accurate adjustment, with cable and chain for supporting the work. Fig. 11 illustrates the method of mounting the pulley in the arm, a section of which is broken out to disclose the construction. Fig. 12 illustrates the construction and mountings of the adjusting-hook, showing the ball-and-socket joint and the triangular slot for the accommodation of the hook as it swings inward toward the center of the tool. Fig. 13 is an enlarged view of the locking dog or pawl with the rigidly-mounted pivot-bolt in the base and the curved spring N mounted in the bolt-slot, which is indicated by dotted lines. Fig. 14 is a sectional elevation of the clamping mechanism through $a$ $b$, Fig. 10, and illustrates the construction of the pawl or locking-dog, with the method of mounting the same upon the arm of the tool. It likewise shows how the lug on the end of the spring N engages the arm G. Fig. 15 is a view of the pivot-bolt and spring and clearly illustrates the construction. The bolt is flat-headed, with a polygonal base and round body. The point is provided with a slot through which the spring N passes. The gibbed head and lug upon the opposite extremity are shown on the spring in this view.

Similar letters represent similar parts in the several views accompanying this specification.

Fig. 10 specifically illustrates my improved supporting-tool with all of the preferred improvements in combination.

The clamp A and the chain B or the rope C constitute practically the broad invention.

The clamping device A is formed of two large hooks, (designated D D',) pivoted together near their angle of curvature by a pivot-bolt E, which is provided with a head $e$ and nut $e'$, which unite the hooks like a pair of shears. When the device is in position for operation, the jaws F occupy vertical, and the arms G horizontal, planes—that is, practically and relatively stand at right angles to each other—in order that any weight applied to the arms transmits a corresponding compressive action or closure of the jaws, or, in other words, the jaws and arms being of equal length, for every pound of weight in the shaft a pound of compressive energy is given to the jaws, which are provided with teeth $f$ where the ordinary wooden floor-beams are used in the structure-frame. These jaws, however, may be made plain where the metallic I-beam is used in the floor above. In some cases the sharp teeth may deface the beam, and therefore become objectionable. To obviate this difficulty, special clamping devices or heads H are pivoted to the jaws F by a bolt $f'$, which passes through the lugs $h$ and a perforation $f^2$ in the jaw F. This sub-jaw or head is provided with a broad clamping-face $h'$, provided with teeth $h^2$, which engage the beam. The arms G and G' are provided with hooks $g$ $g'$ in the simpler form, to which the supporting-chain B is attached. For lifting or raising the shaft from the floor, however, it is found preferable to use the rope C and pulley J. (Shown in Figs. 4, 5, and 6.) This construction provides a very rapid means for lifting the shaft into position. Where delicate adjustment is required, a special hook K is provided, with fingers $k$ $k'$ and a threaded staff $k^2$, with a nut $k^3$ and a hemispherical washer $k^4$, which fits into a cup-shaped cavity $g^2$ in the boss $g^3$ of the arm G. At the bottom of this cavity a longitudinal slot $g^4$ is provided for the staff of the hook K, which permits a limited motion in the hook and accommodates the line of stress to the various elevations of the shaft. Otherwise the staff of the hook might be broken or strained.

In some instances where it is required to support a flat-bottomed body, such as a pillow-block, a special chair L is provided. This chair is shown plain in Fig. 3 of the drawings; but it is preferred with an adjustable seat and pulley-bearing at each of the points of contact with the rope. To absolutely secure this clamping-tool from falling after the bite is taken on the floor-beam, a locking dog or pawl M is seated or pivoted on the arm G by the pivot-bolt $m$, which is made polygonal where it passes through the eye of the dog, round where it passes through the perforation in the arm G, with slot $m'$ for receiving the gibbed end of the spring N, which passes through the slot and is hooked under the arm G. This spring N holds the tooth $m^2$ of the dog in engagement with the ratchet-teeth $f^3$ on the external face of the jaws. This construction may be varied by hanging the dog to the jaw and providing a series of ratchet-teeth upon the under side, which engage by gravity the locking-lug $g^5$ in the arm G. A more positive but much slower locking device consists of a bolt O, provided with a head $o$ and a nut $o'$, which passes through the jaws near the lower edge of the floor-beam.

Having thus fully described the construction of my improved supporting-tool, the operation may be set forth as follows: The arms of the supporting-tool are grasped by the operator, the pawls thrown out of engagement, and the jaws opened sufficiently wide to take in the floor-beam. The tool is then raised into position, one jaw bearing against the floor-beam, and the arms depressed until the teeth suitably engage the fibers of the beam. The rope or chain is then hooked to the arm, passed under the work, and then hooked or passed over the pulley, as the case may be, and the tension brought up on the shaft. Ordinarily this tension may be effected by the rope and pulley alone by taking a turn around the shaft at or near the base of the coupler; but for finer and more accurate adjustment of the shaft recourse may be had to the nuts on the staff of the tension-hook, which readily adjusts itself to any length of hanger.

It is obvious this device may be applied to a variety of other work, such as hanging steam-pipe or holding pipe in position while flange-joints are being packed or otherwise repaired.

Having thus fully described my invention, what I claim as new, and desire to secure by Letters Patent, is—

1. The combination in a supporting-tool of jaws for engaging the beam, levers for compressing the jaws, a locking device for holding the jaws in engagement with the beam, a cable or chain extending from arm to arm with a bearing or chair mounted upon the cable and means for adjusting the work substantially as shown and described.

2. The combination in a supporting-tool of jaws and arms operating in transverse planes, a locking-dog, or pawl and ratchet for locking the bite on the beam, a pulley mounted upon one of the arms and an adjustable hook mounted upon the other arm for connecting a cable or chain to the tool substantially as and for the purpose set forth.

3. In a supporting-tool, substantially as shown, a locking dog or pawl pivoted to the arm of the tool, a slotted pivot-bolt rigidly fixed in the seat of pawl and passing through the arm of the tool, a spring inserted in the slot of the bolt and adapted to engage the under part of the arm and to hold the tooth of the pawl in engagement with the ratchet on the jaw of the tool substantially as shown and described.

4. In a supporting-tool an arm substantially as shown, provided with a boss upon the end of the same, a cup-shaped cavity in the upper surface of the boss, a triangular slot in the bottom of the cup, or cavity, a hook, having a threaded staff with threaded nut and hemispherical washer, mounted in said cavity, substantially as and for the purpose described.

5. In a supporting-tool substantially as shown in combination with the arm thereof, having a boss or enlargement at the end of the arm and a vertical slot in the boss or enlargement, a pulley provided with an annular groove adapted to carry a cable or chain, mounted in the slot, substantially as shown and described.

6. A supporting-tool comprising a pair of hooks pivoted together near their angle of curvature with self-adjusting jaws mounted upon the upper part of the hooks, a pawl mounted upon an arm of the tool, a ratchet upon the external face of one of the hooks, a spring mounted in the pivot-bolt of the pawl and adapted to hold the pawl in engagement with the ratchet and lock the jaws of the tool in engagement with the beam, a hook provided with a threaded staff and nut mounted upon one arm, and a pulley mounted upon the other arm of the tool, a cable or chain connecting the hook and pulley together and a chain mounted upon the cable and adapted to support the work substantially as shown and described.

In testimony whereof I have signed my name to this specification in the presence of two subscribing witnesses.

ALPHA TRUEWORTHEY DUDLEY.

Witnesses:
WALTER B. KNIGHT,
A. E. BOWKER.